United States Patent [19]
Takehara et al.

[11] Patent Number: 6,038,771
[45] Date of Patent: *Mar. 21, 2000

[54] METHOD OF MANUFACTURING TIE ROD BAR FOR STEERING LINKAGE OF MOTOR VEHICLE

[75] Inventors: Nobuyuki Takehara; Kazuhisa Shimoda; Yasuo Morishita, all of Hamamatsu, Japan

[73] Assignee: Rhythm Corporation, Shizuoka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/730,209

[22] Filed: Oct. 15, 1996

[30] Foreign Application Priority Data

Dec. 22, 1995 [JP] Japan ...................................... 7-334408
Mar. 8, 1996 [JP] Japan ...................................... 8-051170

[51] Int. Cl.⁷ ...................................................... B23P 13/04
[52] U.S. Cl. ................... 29/897.2; 72/370.02; 72/370.03; 72/370.13
[58] Field of Search ................................. 29/896.5, 897.2, 29/527.2, 527.4; 72/370.01, 370.02, 370.03, 370.04, 370.1, 370.13, 370.15, 367.1

[56] References Cited

U.S. PATENT DOCUMENTS

| | | |
|---|---|---|
| 2,165,472 | 7/1939 | Friedman . |
| 2,256,065 | 9/1941 | Urschel et al. . |
| 2,380,952 | 8/1945 | Dewey . |
| 3,249,990 | 5/1966 | Schlage . |
| 3,314,143 | 4/1967 | McDonald et al. ........................ 29/528 |
| 3,476,413 | 11/1969 | Coberly et al. . |
| 3,854,316 | 12/1974 | Wilson . |
| 3,889,511 | 6/1975 | Bayle . |
| 3,897,616 | 8/1975 | Williams . |
| 4,038,850 | 8/1977 | Sakagami ..................................... 72/85 |
| 4,059,977 | 11/1977 | Kaporovich et al. . |
| 4,073,178 | 2/1978 | Dutartre et al. . |
| 4,435,972 | 3/1984 | Simon ....................................... 72/256 |
| 4,601,215 | 7/1986 | Barnabe et al. ............................... 29/11 |
| 4,625,537 | 12/1986 | Aleck . |
| 4,691,550 | 9/1987 | Dietzel ....................................... 29/508 |
| 4,722,216 | 2/1988 | Fencl . |
| 4,726,211 | 2/1988 | Sunaga et al. . |
| 4,761,873 | 8/1988 | Wetzel et al. ............................... 29/517 |
| 5,027,763 | 7/1991 | Mallas . |
| 5,231,916 | 8/1993 | Weiler .................................... 29/888.04 |
| 5,243,880 | 9/1993 | Beier et al. . |
| 5,391,113 | 2/1995 | Tanaka . |

FOREIGN PATENT DOCUMENTS

| | | |
|---|---|---|
| 856256 | 11/1952 | Germany . |
| 30 26 311 | 2/1982 | Germany . |
| 195 36 035 | 4/1997 | Germany . |
| 56-6748 | 1/1981 | Japan . |
| 58-56970 | 4/1983 | Japan . |
| 5/170128 | 7/1993 | Japan . |

OTHER PUBLICATIONS

Japanese Abstract and Figures for 102325, Aug. 1981.

*Primary Examiner*—David P. Bryant
*Attorney, Agent, or Firm*—Wenderoth, Lind & Ponack, L.L.P.

[57] ABSTRACT

A method of manufacturing a tie rod bar for a steering linkage of a motor vehicle. Between both end portions of a steel pipe material, through a multistage cold forging, there are formed a spherical section, a neck section, a first shaft section, a second shaft section smaller in diameter than the first shaft section, a hexagonal section, and a third shaft section smaller in diameter than the second shaft section, to thereby constitute the tie rod bar. Secondly, the neck section is formed at a portion of the first shaft corresponding to a proximal end portion of the spherical section, a boot groove is formed at a given position on the second shaft section, close to the spherical section, and a screw section is formed on the third shaft section. Subsequently, a heat treatment is performed to remove the residual stress from the formed components concurrently with increasing the strength and improving the ductility. Finally, a coating is made for rust prevention. The boot groove is made to have an uneven configuration.

19 Claims, 10 Drawing Sheets

METHOD OF MANUFACTURING TIE ROD BAR FOR STEERING LINKAGE OF MOTOR VEHICLE

BACKGROUND OF THE INVENTION

The present invention relates to a method of manufacturing a tie rod bar for a steering linkage of a motor vehicle, and more particularly to a method of manufacturing a tie rod bar with a hollow structure using as a material a steel pipe cut into a given length.

Figure 10:
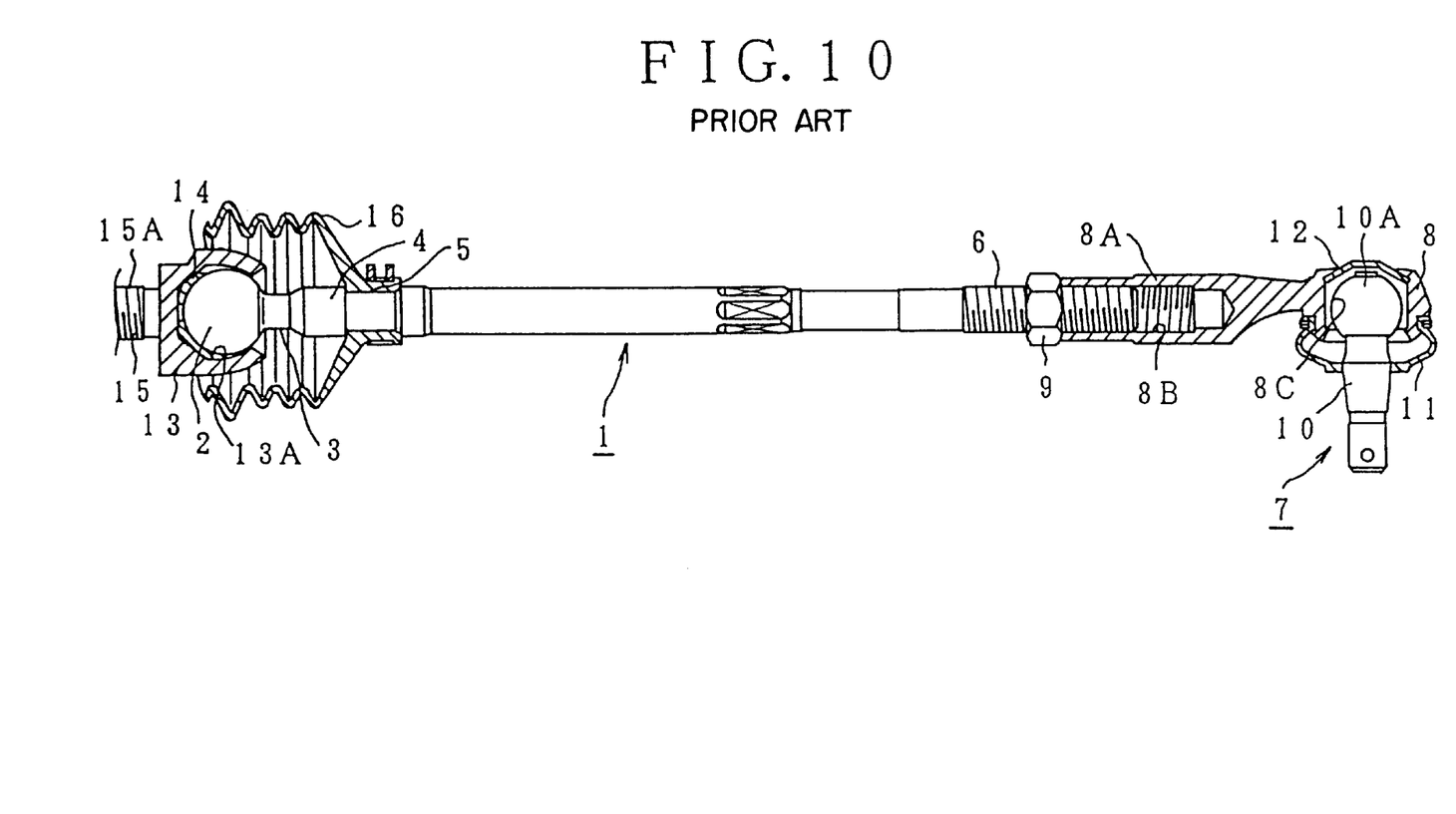
FIG. 10 is an illustration for describing an assembled state of a prior tie rod bar.

As a tie rod bar for use in a rack and pinion type steering linkage of a motor vehicle, there has hitherto been known a tie rod bar, for example, as shown in FIG. 10. The prior tie rod bar 1 has a sphere section 2 at its one end portion and a neck section 3 adjacent to the sphere section 2 and further a shaft section 4 adjacent to the neck section 3, with a boot groove 5 being made in the shaft section 4. In addition, the prior tie rod bar 1 has a screw section 6 at its other end portion, which is screwed in a screw hole 8B made in an extending section 8A of a socket 8 of a ball joint 7. Further, a nut 9 tightens the extending section 8A to prevent the screw section 6 from getting loose. The socket 8 has a housing hole 8C in which a sphere section 10A of a ball stud is accommodated through a bearing sheet to be slidable. Further, a dust cover 11 is fitted between the socket 8 and the ball stud 10, and a bottom edge portion of the socket 8 is caulked with respect to an end cover 12. The sphere section 2 of the tie rod bar 1 is rotatably slidably encased within a housing hole 13A of a socket 13 through a bearing sheet 14, while a shaft section 15 constituting a screw section 15A is formed to protrude from the socket 13. A boot 16 is fitted between the socket 13 and the boot groove 5 of the shaft section 4.

The tie rod bar 1 is produced by forming a circular bar material through a cold forging or hammering and then by performing a mechanical process (cutting process). In addition, recently, for the reduction in weight, the tie rod bar has been manufactured by a swaging process using as a material a steel pipe cut into a given length.

However, in the case of employing the prior method of manufacturing the tie rod bar with a hollow structure using the steel pipe material in the swaging process, the wall thickness varies by location so that the strength of a thin portion becomes unsatisfactory. Further, since the steel pipe material receives a load from both sides in the swaging process, wrinkles can arise on its inner surface to cause the occurrence of cracks. Moreover, the swaging process itself can not impart a sufficient hardness to the material, with the result that the tie rod bar can not have a sufficient strength. Further, the strength varies among the tie rod bars so that the product quality becomes unstable.

Furthermore, although in the prior tie rod bar its boot groove is formed by the swaging process or a rolling process (roll forging), the swaging process takes time to form the boot groove, thus deteriorating the productivity. Further, the roll forging can not form the boot groove in a single operation because the boot groove has a straight configuration, that is, it requires 4 to 5 operations using 4 to 5 kinds of roll dies. In addition, when the boot is mounted in the boot groove, the contact surface pressure is low because the boot groove has the straight configuration so the airtightness becomes unsatisfactory. Moreover, both the corner edge portions of the boot groove tend to become broken, therefore making it difficult to arrange their shapes. If the shape is arranged by force through the rolling, the wall thickness is reduced so that it becomes difficult to ensure its strength.

SUMMARY OF THE INVENTION

It is therefore an object of the present invention to provide a method of manufacturing a tie rod bar with a hollow structure, which is capable of improving the inner surface accuracy not only to offer a uniform wall thickness but also to prevent the occurrence of wrinkles, and even to make the strength stable.

In accordance with the present invention, a tie rod bar manufacturing method comprises the following steps:

a multistage forging step of using as a material a steel pipe cut into a given length and forming a spherical section, a neck section, a first shaft section, a second shaft section smaller in diameter than the first shaft section, a hexagonal section and a third shaft section smaller in diameter than the second shaft section, which constitutes a tie rod bar, between both end portions of the steel pipe material by means of the multistage cold forging;

a neck section forming step of forming the neck section at a portion of the first shaft section which corresponds to a proximal end portion of the spherical section, a boot groove forming step of forming a boot groove at a given position on the second shaft section close to the spherical section;

a screw section forming step of forming a screw section in the third shaft section;

a heat treatment step of performing a heat treatment for removing residual stresses from the components formed in the aforesaid steps, increasing strengths thereof, and improving ductility thereof; and a coating step of coating the heat-treated components for rust prevention.

In addition, the multistage forging step includes the following five steps:

a first step of, for forming the first shaft section, carrying out cold forging in a state that a mandrel is inserted into the steel pipe material cut into the given length so that a large diameter portion remains in the one end side where the spherical section is formed while the other end side undergoes a shank reduction;

a second step of shank-reducing the first shaft section from its substantially central portion to the other end side by cold forging to form the second shaft section of a reduced diameter;

a third step of shank-reducing the first shaft section from its substantially central portion by cold forging to provide a diameter equal to that of the second shaft section so that the second shaft section extends further to the first shaft section side;

a fourth step of shank-reducing an end side of the second shaft section by cold forging to form the third shaft section which is further reduced in diameter; and a fifth step of forming the spherical section at the large diameter portion by cold forging and further forming a hexagonal section with a hexagonal cross section at a portion of the second shaft section adjacent to the third shaft section.

Furthermore, a connecting portion between the large diameter portion and the first shaft section in the first step, a connecting portion between the first shaft section and the second shaft section in the second and third steps, and a connecting portion between the second shaft section and the third shaft section in the fourth step are respectively formed to have a tapered-shaft configuration. Simultaneously in the screw section forming step the spherical section undergoes a sphere rolling process. However, this sphere rolling process is omissible under certain circumstances. Further, each of the neck section forming step, the boot groove forming step and the screw section forming step employs a rolling process. Each of the neck section forming step and the boot groove forming step can employ a swaging process. Still further, in the heat treatment step, the blueing heat treatment is performed at a given temperature within a range of 300 to 400° C. for several minutes to approximately one hour.

Thus, the manufacturing method according to the present invention can prevent the occurrence of wrinkles on the inner surface of the form of the tie rod bar made from a steel pipe and irregularity of the wall thickness thereof through the multistage step of shank-reducing the steel pipe by inserting the mandrel thereinto. In addition, the multistage forging can provide work hardening to increase its strength concurrently with achieving a natural formation, whereas the blueing heat treatment finally accomplishes the removal of the residual stresses, the increase in strength, and the improvement in the ductility, thus ensuring the necessary strength and stabilizing the quality of the products and achieving a high yield.

Moreover, the present invention can provide a method of easily forming the boot groove which is capable of ensuring that the connection of a boot thereto is highly airtight. In the boot forming step according to this invention, in a first rolling step, a pair of ring-like corner grooves are formed at both end portions of the second shaft section, and in a second rolling step, an uneven or corrugated groove section with an irregular cross section in which high and low portions successively exist is formed between the pair of ring-like corner grooves, formed in the first step, through the rolling using a second roller. Since the pair of ring-like corner grooves are formed at portions in both the sides of the boot groove in the first rolling step and then an uneven groove section is formed therebetween, the rolling becomes easy. The uneven groove section can also be made by performing the rolling once, with the result that the processing time becomes shorter to improve the productivity. Since the rolling process can facilitate the deformation, the uneven groove section is formed in a state that both sides of the first shaft section are free end portions. In addition, in order to heighten the accuracy of the uneven groove section, both the end portions or one end portion can be fixed. Moreover, it is also possible that the uneven groove section is formed while a pressing load is applied to the first shaft section from both axial directions so that the deformation becomes easy during rolling. It is preferable that the uneven groove section to be provided in the boot groove has wedge-like asymmetrical configurations in which the inclination angle in the direction of detaching the boot is made to be larger than the inclination angle in the direction of attaching the boot. This asymmetrical uneven groove section makes the insertion of the boot easy and makes it difficult for the boot to come off the boot groove and further increases the contact surface pressure of the boot to heighten the airtightness. The uneven groove section has a screw groove configuration, a bellows groove configuration or a configuration combining the screw groove and bellows groove configurations. Still further, for facilitating the groove forming process, a straight portion having no unevenness can be formed in a central portion of the uneven groove section.

The above and other objects, features, and advantages of the present invention will become more apparent from the following detailed description with reference to the drawings.

DETAILED DESCRIPTION OF THE INVENTION

Figure 1A:
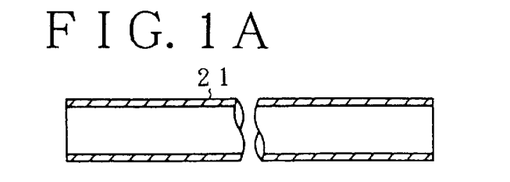
FIGS. 1A to 1F are illustrations of a cold forging process according to the present invention.
Figure 1B:
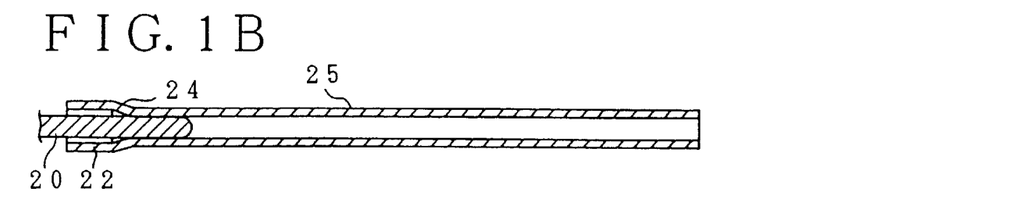

FIGS. 1A to 1F are illustrations of a multistage cold forging process in a tie rod bar manufacturing method according to the present invention. First of all, as shown in FIG. 1A, prepared as a tie rod bar material is a steel pipe 21 cut into a given length, and then in a first process or step, as shown in FIG. 1B a mandrel 20 is inserted into the steel pipe 21 through cold forging in a multistage press so that a large diameter section 22 remains at one end portion while a first shaft section 25 with a small diameter is formed by the shank reducing toward the other end portion. At this time, a first tapered section 24 gradually decreasing in diameter is formed in the connecting section between the large diameter section and the small diameter section 25. The insertion of the mandrel 20 thereinto is to improve the surface roughness of its inner surface and eliminate its irregular wall thickness.

Figure 1C:
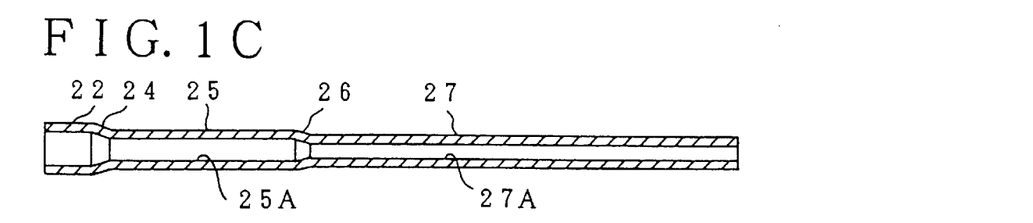

In a second process as shown in FIG. 1C, shank-reduction by cold forging is carried out from a portion of the first shaft section (or first diameter section) 25 slightly shifted from a substantially central portion of the first shaft section 25 to the large diameter section 22 side to form a second shaft section (or second diameter section) 27 with a diameter smaller than that of the first shaft section 25. As a result, from the steel pipe 21 there are formed the large diameter section 22, the first tapered section 24, the first shaft section 25, a second tapered section 26, and the second shaft section 27. The second shaft section 27 is made to have a length longer than that of the first shaft section 25. A shaft hole 27A of the second shaft section 27 is made to have a diameter smaller than a hole 25A of the first shaft section 25.

Figure 1D:
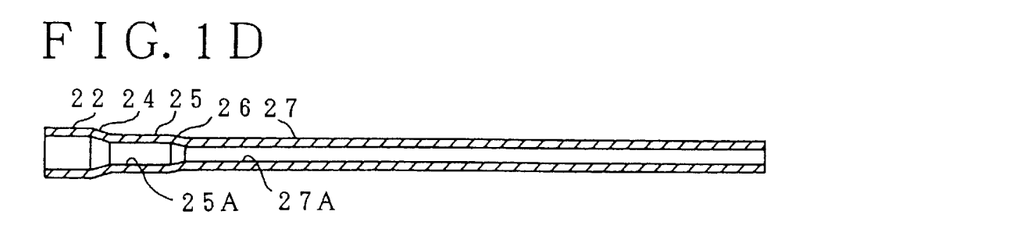

In a third process as shown in FIG. 1D, cold forging is carried out to shank-reduce the first shaft section 25 from its substantially central portion toward the smaller diameter second shaft section 27 side. Accordingly, the length of the first shaft section 25 in its longitudinal direction decreases, while the length of the second shaft section 27 in its longitudinal direction increases. A hole 25A of the first shaft section 25 is the same in diameter as the hole 25A of the first shaft section 25 in the FIG. 1C process, and a hole 27A of the second shaft section 27 is the same in diameter as the hole 27A of the second shaft section in the FIG. 1C process. Since the first shaft section 25 and the second shaft section 27 are thus formed in two separate processes, buckling during formation can be prevented and variation of the total length can be suppressed.

Figure 1E:
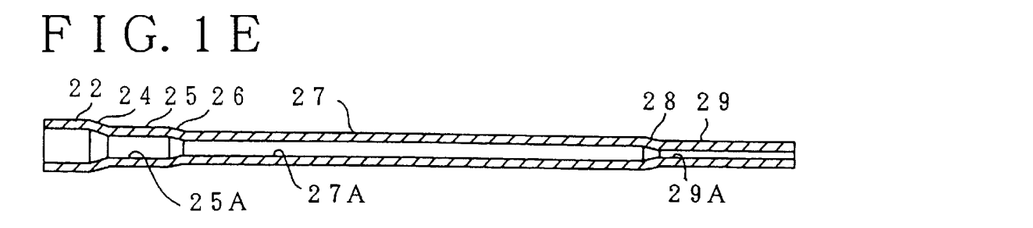

In a fourth process as shown in FIG. 1E, cold forging is carried out to shank-reduce the second shaft section 27 toward one shaft end portion to form a third shaft section (or third diameter section) 29. Also in this case, a third tapered section 28 is formed following the second shaft section 27, with the result that the third shaft section 29 is formed without the occurrence of forced deformation. A hole 29A of the third shaft section 29 is made to have a diameter smaller than the hole 27A of the second shaft section 27.

Figure 1F:
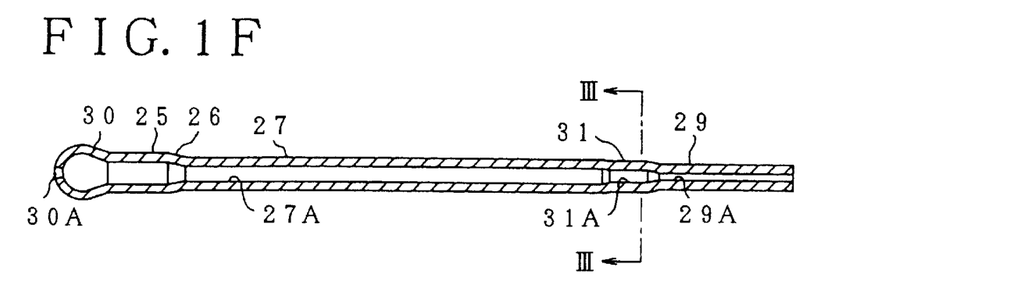
Figure 3:
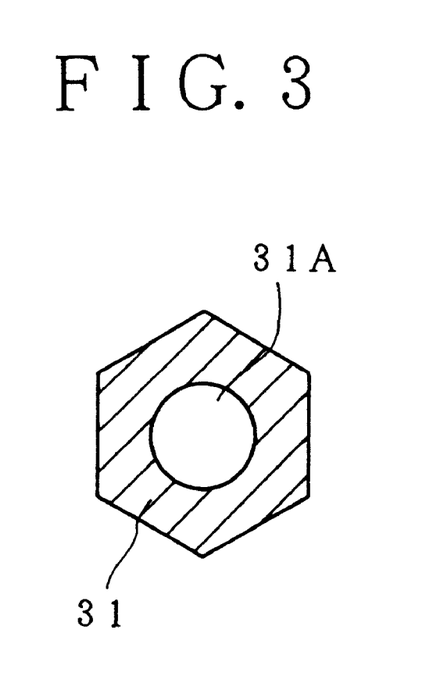
FIG. 3 is a cross-sectional view taken along a line III—III of FIG. 1F.

In a fifth process as shown in FIG. 1F, cold forging is carried out to form the large diameter section 22 and the first tapered section 24 into a spherical section 30. At this time, a hole 30A is formed at a tip portion of the spherical section 30. At the same time, a hexagonal section 31, having a hexagonal cross section and having a hole 31A therein as shown in FIG. 3, which is a cross-sectional view taken along a line III—III of FIG. 1F, is formed at a portion of the second shaft section 27 before the third tapered section 28.

Figure 2A:
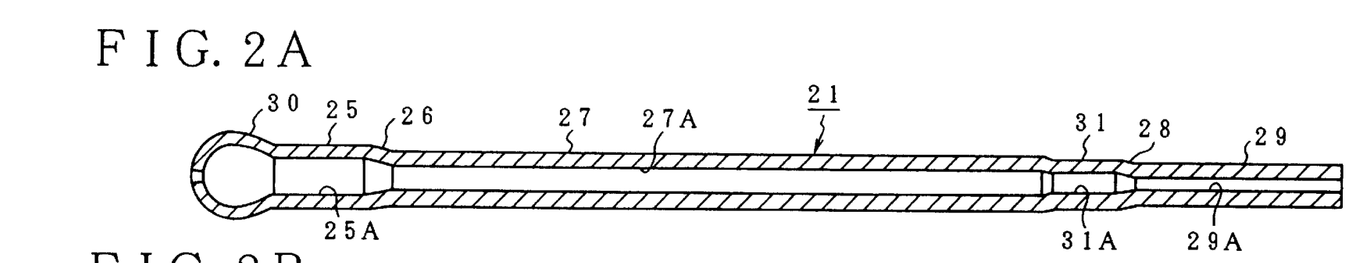
FIGS. 2A to 2D are explanatory illustrations of a rolling process or a swaging process subsequent to the cold forging process of FIGS. 1A to 1F.

FIGS. 2A to 2D are illustrations for describing a neck section forming process, a boot groove forming process and a screw section forming process after the multistage forging process according to the present invention. FIG. 2A is a cross-sectional view of the steel pipe 21 attained through the multistage forging processes shown in FIGS. 1A to 1F, with the steel pipe 21 being equipped with the spherical section 30, the first shaft section 25, the tapered section 26, the second shaft section 27, the hexagonal section 31, the third tapered section 28, and the third shaft section 29.

Figure 2B:
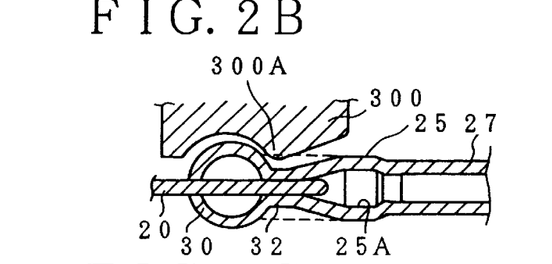

In the neck section forming process as shown in FIG. 2B, a neck section 32 is formed at a proximal end portion of the spherical section 30 through a rolling process or a swaging process. A roller 300 is used in the rolling process or the swaging process for forming the neck section 32. The roller 300 is provided with a projecting portion 300A which forms the neck section 32. The formation of the neck section 32 results in reducing the diameter of the hole 25A of the first shaft section 25. At this time, a mandrel is inserted thereinto to improve the surface roughness and further to prevent the occurrence of wrinkles. The neck section 32 has a small diameter hole 32A which, in turn, is enlarged toward the first shaft section 25 side to make a tapered configuration.

Figure 2C:
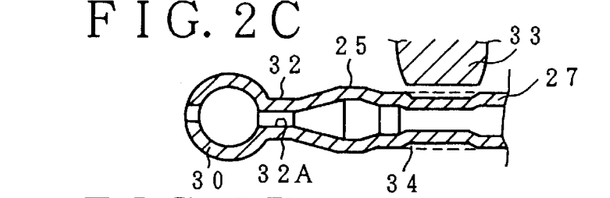

In the boot groove forming process as shown in FIG. 2C, a boot groove 34 is formed at a given position on the first shaft section 25 by means of a rolling process or a swaging process. Since the position of the boot groove 34 depends upon the specific dimension from the spherical section 30, the boot groove 34 is formed with a roller 33 positioned at the specified dimension from the spherical section 30. Incidentally, the roller 33 is replaceable with a die.

Figure 2D:
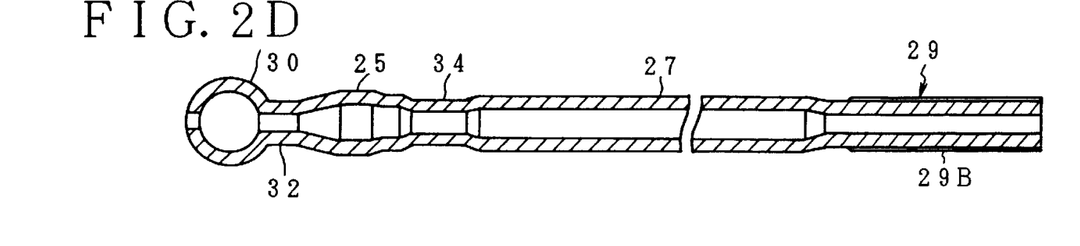

In the screw section forming process as shown in FIG. 2D, a rolling process is carried out to form a screw section 29B on the third shaft section 29. Simultaneously with this, the spherical section 30 again undergoes a rolling process. It is also possible that this rolling process for the spherical section 30 is omissible. When this screw section forming process comes to an end, the formation of the tie rod bar is finished. Subsequently, in the heat treatment process the formed tie rod bar is subjected to a blueing heat treatment. In the blueing heat treatment, the heat treatment is carried out at a given temperature within a range of 300 to 400° C. for several minutes to approximately one hour. This can achieve the removal of the residual stress occurring during the forging processes and the rolling processes, an increase in strength and an improvement in ductility. Finally, in the coating process, a cation coating is provided as a rust preventive coating on the finished tie rod bar form.

Figure 4:
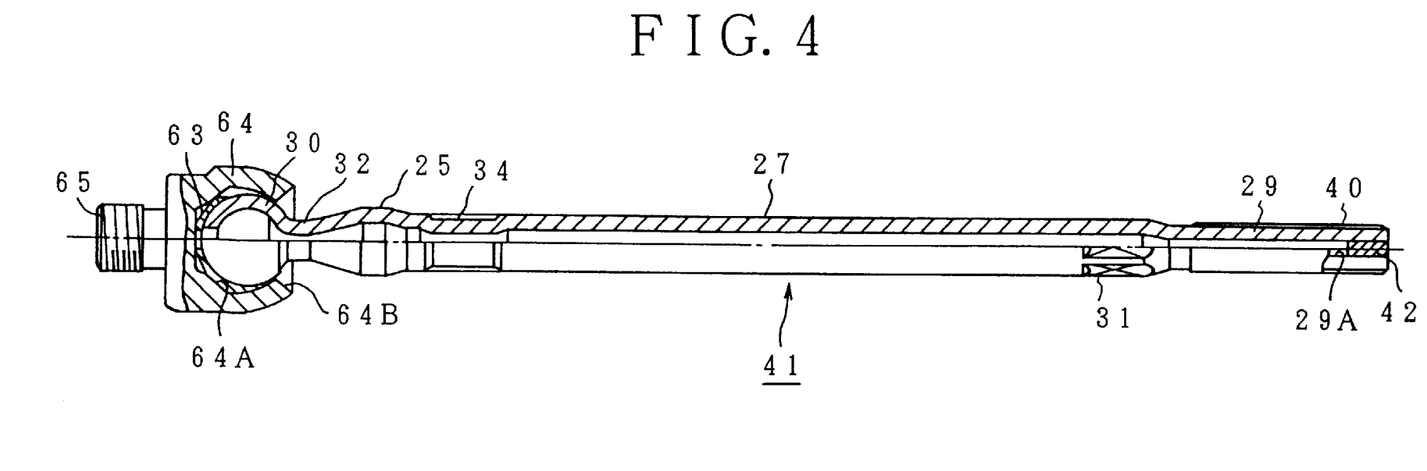
FIG. 4 is an illustration useful for describing an assembled and completed state of a tie rod bar.

FIG. 4 is a partially axial cross-sectional view showing an assembling state of a ball joint socket for the tie rod bar manufactured according to the present invention. A blind closure 42 is inserted into the hole 29A of the third shaft section 29 of the tie rod bar 41 formed through the processes as shown in FIGS. 1A to 1F and FIGS. 2A to 2D. Further, the spherical section 30 is accommodated via a resin bearing 63 within a housing hole 64A of a socket 64 so as to be rotatably slidable. An opening 64B of the socket 64 is caulked inwardly to prevent the sphere section 30 from coming out of the socket 64. A shaft section 65 is integrally formed with the socket 64.

Figure 5A:
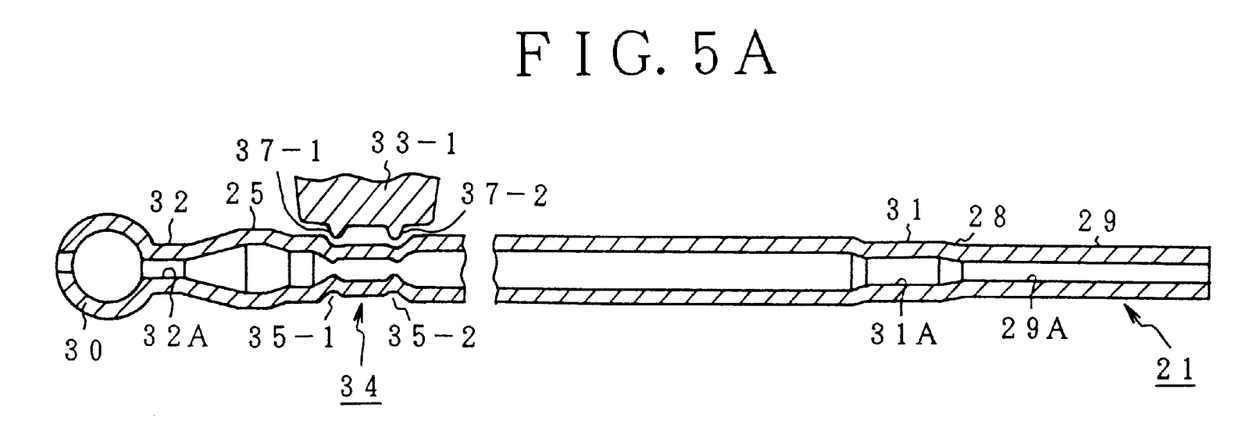
FIGS. 5A and 5B are illustrations available for describing first and second rolling processes for forming a boot groove.
Figure 5B:
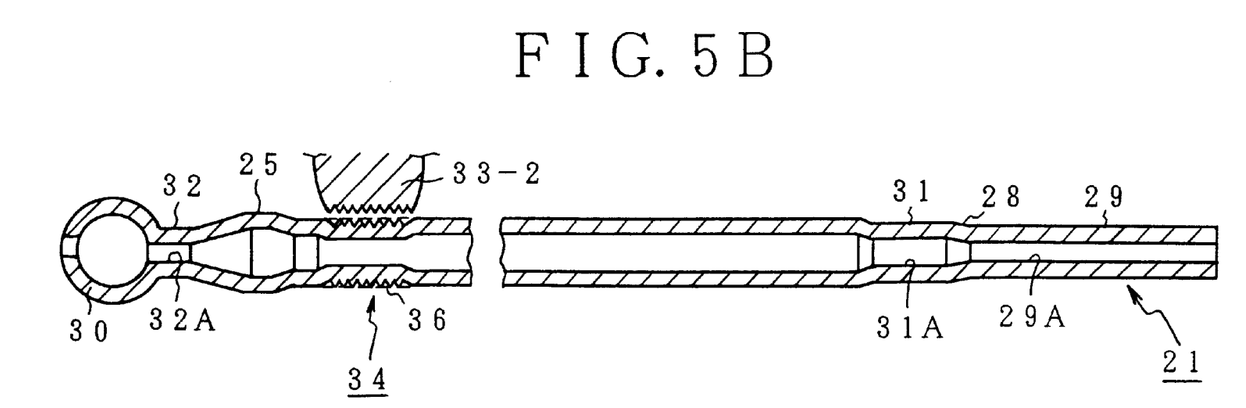
Figure 6A:
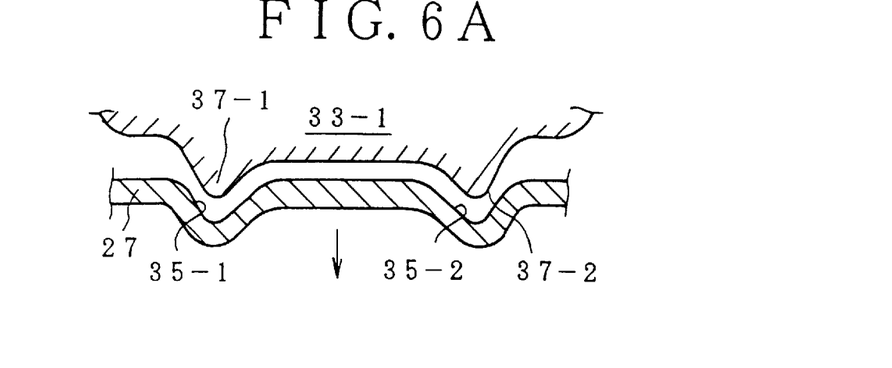
FIGS. 6A to 6D are illustrations for explaining in detail the first and second rolling processes for the formation of the boot groove.

FIGS. 5A and 5B show a boot groove forming process according to another embodiment of the present invention. Although the boot groove shown in FIG. 2C has a straight configuration, in this embodiment a boot groove with an uneven configuration is formed by means of a rolling process. FIG. 5A illustrates a first rolling process for forming a pair of ring-like (or annular) corner grooves 35-1 and 35-2 through the use of a first roller 33-1, and FIG. 5B shows a second rolling process for forming an uneven groove section 36 having an uneven configuration between the ring-like corner grooves 35-1 and 35-2 through the use of a second roller 33-2. In the first rolling process as shown in FIG. 5A, as illustrated in an enlarged view of FIG. 6A the pair of ring-like corner grooves 35-1 and 35-2 are formed in the second shaft section 27 by means of a pair of projections 37-1 and 37-2 formed at both sides of the first roller 33-1. The separation between the pair of ring-like corner grooves 35-1 and 35-2 corresponds to the length of the boot groove 34.

Figure 6B:
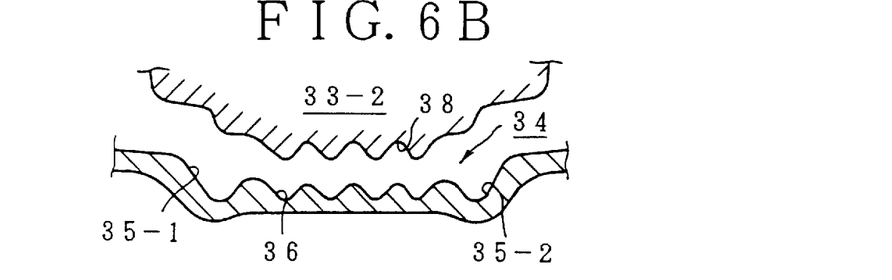

The second rolling process illustration of FIG. 5B is enlarged in FIG. 6B. In the second rolling process, the uneven groove section 36 is formed between the ring-like corner grooves 35-1 and 35-2 of the second shaft section 27 by means of the second roller 33-2 having unevenness forming grooves 38 on its circumferential surface, thus defining the boot groove 34. During the rolling by the second roller 33-2, the second shaft section 27 side is in a free condition, with the result that the deformation of the second shaft section 27 side is not limited during the rolling and hence the processing becomes easy.

Figure 6C:
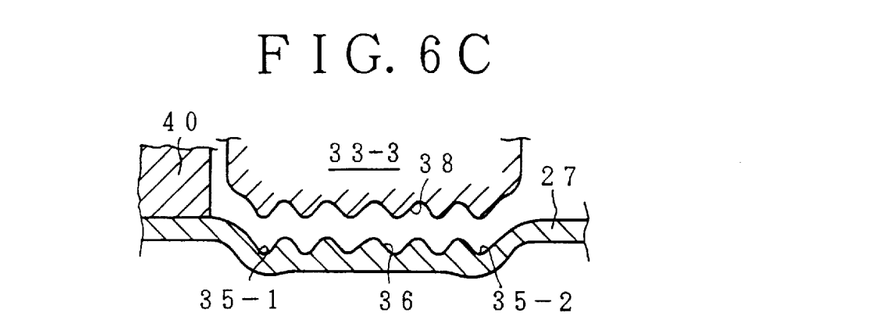

FIG. 6C shows a rolling process according to a further embodiment of this invention. In this embodiment one end side of the second shaft section 27 is fixed by a fixing member 40 while the other end side constitutes a free end portion, and the uneven groove section 36 is formed using a roller 33-3. In this case, in the side fixed with the fixing member 40, the accuracy of the uneven groove section 36 improves. It is also appropriate to fix both the end portions of the second shaft section 27.

Figure 6D:
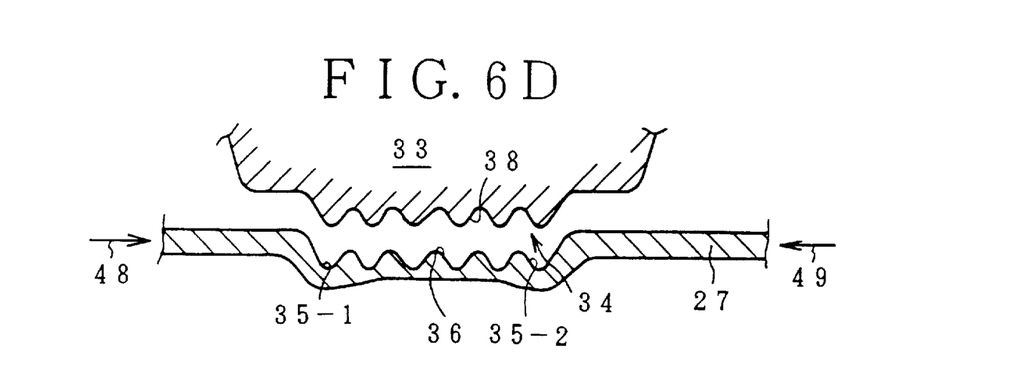

FIG. 6D shows a rolling process according to a further embodiment of this invention. In this embodiment, a load is applied to the second shaft section 27 from both axial directions as indicated by arrows 48 and 49. In this instance, the portion of the second shaft section 27 where the boot groove 34 is made easily takes a corrugated configuration, that is, the formation becomes easy. It is also appropriate that a load is applied thereto from one end side. Incidentally, the first rolling process of FIG. 5A can be omitted such that the second rolling process can be carried out directly instead. The cases of FIGS. 6C and 6D are the same in this point.

Figure 7A:
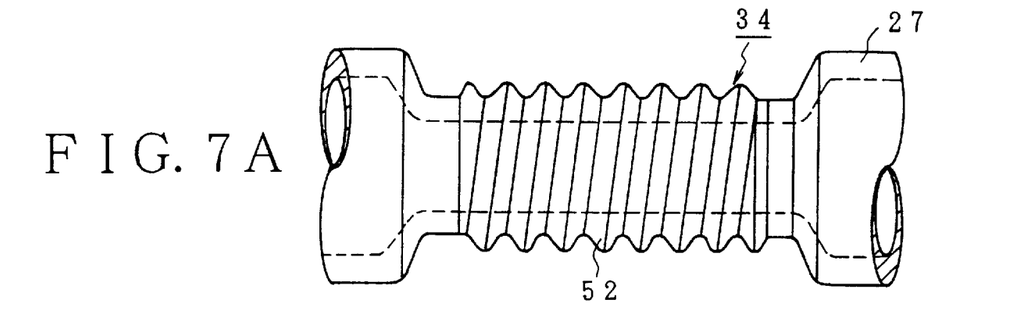
FIGS. 7A to 7D are illustrations for explaining different kinds of boot grooves.
Figure 7B:
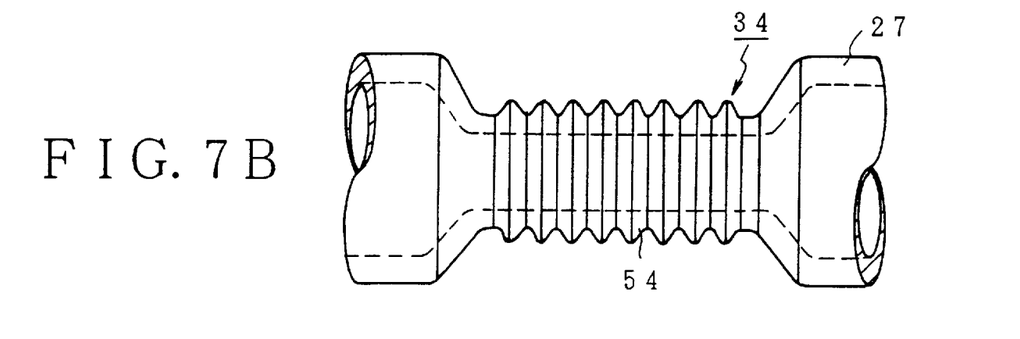
Figure 7C:
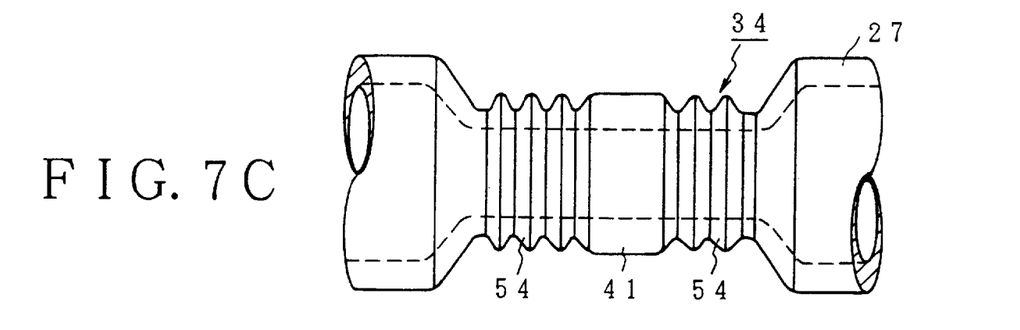
Figure 7D:
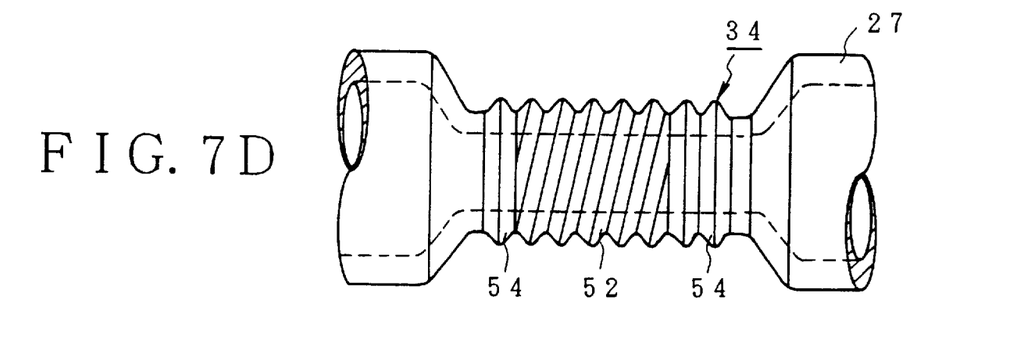

FIGS. 7A to 7D are illustrations of uneven configurations of the boot groove 34 formed through the boot forming process according to this invention. FIG. 7A shows a screw-like groove 52, FIG. 7B shows a bellows-like groove 54 formed by continuously making ring-like grooves, FIG. 7C shows a configuration in which a straight portion 41 with no unevenness is placed at a central section and bellows-like grooves are formed on both sides of the straight section 41, and FIG. 7D shows a configuration combining a screw-like groove 52 and a bellows-like groove 54. Since the boot groove 34 has the uneven configuration, the rolling becomes easy in the rolling process, and hence the processing can be completed with the rolling being performed once, thus resulting in a shortening of the processing time to improve the productivity. In addition, the contact surface pressure for sealing the boot increases due to the uneven configuration, to thereby improve the airtightness.

Figure 8:
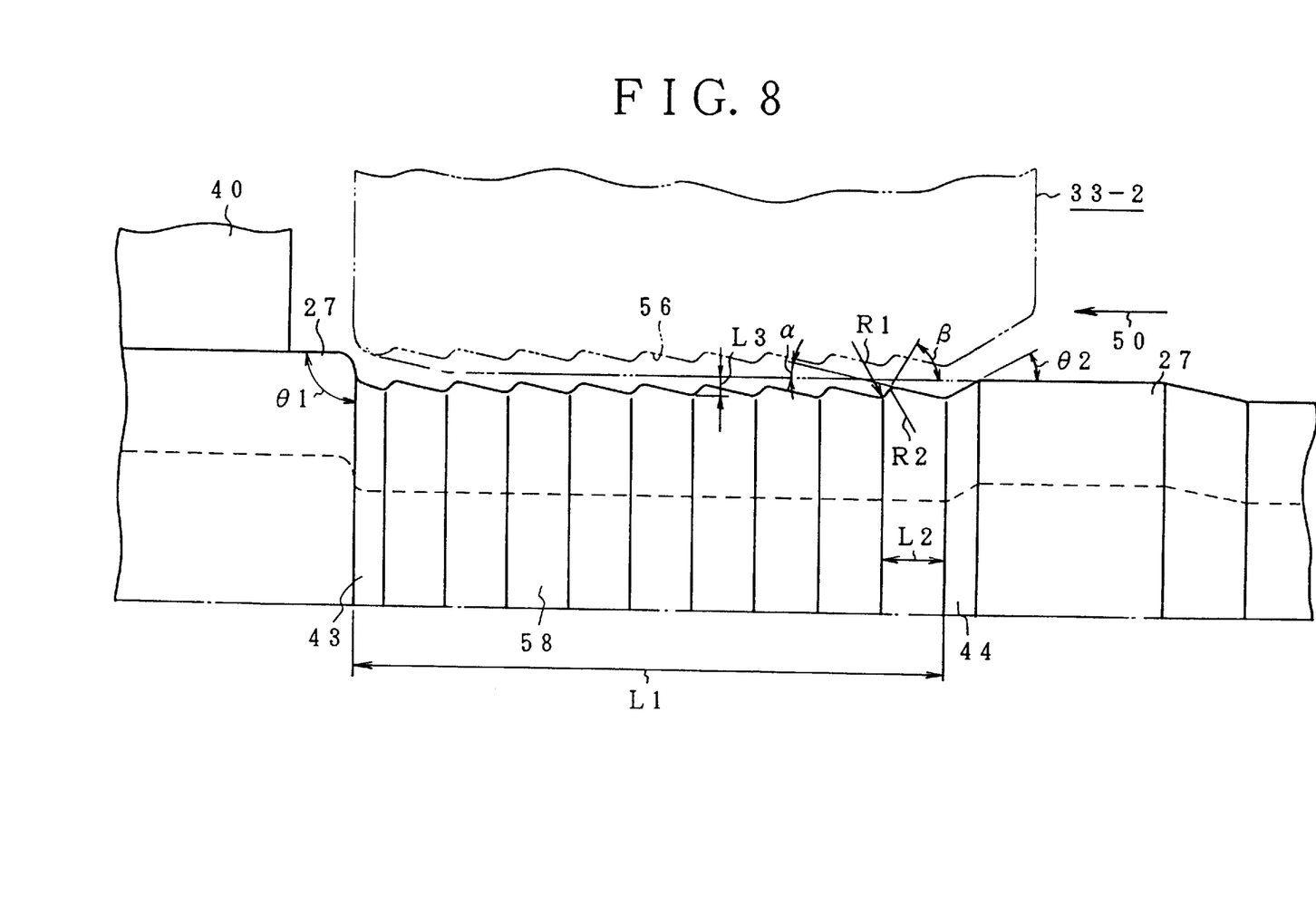
FIG. 8 is an illustration for describing a boot groove with an asymmetrical uneven configuration.

FIG. 8 shows a formation of an uneven groove section in the boot groove according to a further embodiment of this invention. A feature of this embodiment is to form an asymmetrical uneven groove section. The roller 33-2 has an asymmetrical uneven configuration 56 on its rolling surface so that an asymmetrical uneven groove section 58 is formed on the second shaft section 27 through the rolling operation. The length LI of the whole boot groove 34 is set, for example, to 19 mm, and the length L2 of one high portion (i.e. the distance between low points, or the pitch) is determined to be, for example, 2 to 3 mm. A ring-like corner groove portion 43 defining a groove-rising corner edge on the fixing member 40 side can be formed so that the corner edge angle θ1 is, for example, 90 degrees, whereas the inclination angle θ2 of a ring-like corner groove portion 44 on the free end side is set to be within a range of 30 to 50 degrees because high accuracy is difficult. Further, the rolling dimension L3 is approximately 0.7 to 1.0 mm so that the processing can be finished with the rolling being pre-formed once.

Assuming that the boot is fitted over the groove 58 from a direction indicated by an arrow 50, the taper (rising) angle of each high portion of the asymmetrical uneven groove section 58 formed along the fitting direction is set to be 10 to 15 degrees, while the taper angle β thereof formed along the opposite direction is set to be as large as approximately 60 degrees. Further, the radii R1 and R2 of the high and low portions of the asymmetrical uneven groove section 58 are set to 0.3 to 0.4 mm. Because of the formation of the asymmetrical uneven groove section 58, the boot can readily be fitted but will not readily come off the boot groove. Besides, the boot contact surface pressure increases to improve the airtightness.

Figure 9:
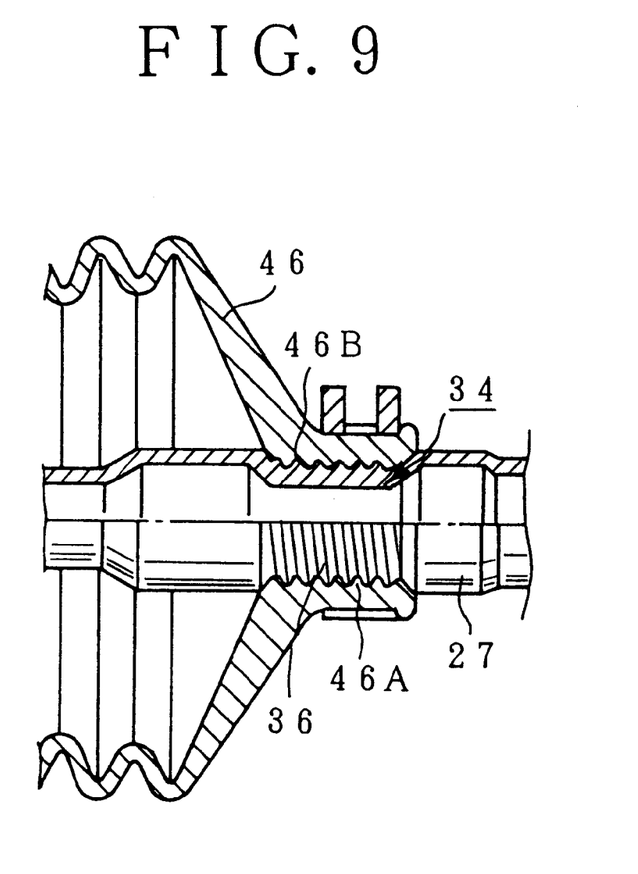
FIG. 9 is an illustration for describing the fitting of a boot in the boot groove.

FIG. 9 shows an assembling state of a boot over the boot groove. A rod mounting section 46A of a boot 46 has, on its inner surface, an uneven groove section 46B corresponding to the uneven groove section 36 formed in the boot groove 34. Accordingly, the uneven groove section 36 of the boot groove 34 is tightly engaged with the uneven groove section 46B of the boot 46 at mounting so that the contact distance lengthens to ensure the airtightness. It is also possible that the inner surface of the cylindrical section 46A has a straight configuration. In this case, due to the uneven groove section 36 of the boot groove 34, the contact surface pressure with the boot 46 side increases to heighten the airtightness.

This invention is not limited to the above-described embodiments, and modifications of the embodiments are possible, which do not constitute departures from the objects and advantages of this invention. Further, the invention is not limited to values specified for the above described embodiments.

What is claimed is:

1. A method of manufacturing a tie rod bar having a uniform wall thickness for use in a steering linkage of a motor vehicle, said method comprising:

providing a steel pipe of a given length and a given wall thickness;

a multistage forging step including a first stage of forming on said steel pipe a first diameter section by performing a cold forging while maintaining said given wall thickness in a state that a mandrel is inserted into said steel pipe so that a large diameter portion remains in one end portion of said steel pipe at a location corresponding to a location where a spherical section is to be formed, while an opposite end portion of said steel pipe is shank-reduced to form said first diameter section, a second stage of shank-reducing a first portion of said first diameter section from a location in a central portion of said steel pipe to one end thereof by cold forging to form a second diameter section smaller in diameter than said first diameter section while maintaining said given wall thickness, a third stage of shank-reducing a second portion of said first diameter section from a location in a central portion of said first diameter section toward said one end portion of said steel pipe by cold forging to provide a diameter equal to that of said second diameter section so that said second diameter section extends further toward said one end portion of said steel pipe while maintaining said given wall thickness, a fourth stage of shank-reducing a portion of said second diameter section at said opposite end portion of said steel pipe by cold forging to form a third diameter section smaller in diameter than said second diameter section while maintaining said given wall thickness, and a fifth stage of forming said spherical section at said large diameter portion of said steel pipe by cold forging while maintaining said given wall thickness and further forming a hexagonal section with a hexagonal cross section at a portion of said second diameter section adjacent said third diameter section;

a neck section forming step of forming a neck section at a portion of said first diameter section adjacent said spherical section;

a boot groove forming step of forming a boot groove at a given position on said second diameter section;

a screw section forming step of forming a screw section on said third diameter section;

a heat treatment step of performing a heat treatment for removing residual stresses from components formed in said multistage forging step, said neck section forming step, said boot groove forming step and said screw section forming step to thereby increase strengths and improve ductility thereof; and a coating step of coating the heat-treated components for rust prevention.

2. A manufacturing method as defined in claim 1, wherein a connecting portion between said large diameter portion and said first diameter section formed in said first step, a connecting portion between said first diameter section and said second diameter section formed in each of said second and third steps, and a connecting portion between said second diameter section and said third diameter section formed in said fourth step are respectively formed to have tapered configurations.

3. A manufacturing method as defined in claim 1, wherein a spherical rolling process is performed on said spherical section simultaneously with said screw section forming step.

4. A manufacturing method as defined in claim 1, wherein, in each of said neck section forming step, said boot groove forming step and said screw section forming step, a rolling process is employed.

5. A manufacturing method as defined in claim 1, wherein, in each of said neck section forming step and said boot groove forming step, a swaging process is employed.

6. A manufacturing method as defined in claim 1, wherein, in said heat treatment step, a blueing heat treatment is carried out at a given temperature within a range of 300 to 400° C. for several minutes to approximately one hour.

7. A manufacturing method as defined in claim 1, wherein said boot groove forming step comprises:
a first rolling step of forming a pair of annular corner grooves in said second diameter section to form said boot groove through a rolling operation using a first roller; and
a second rolling step of forming an uneven groove section with an irregular cross section in which high and low portions successively exist between the pair of annular corner grooves, formed in said first step, through a rolling operation using a second roller.

8. A manufacturing method as defined in claim 1, wherein said boot groove forming step comprises:
a rolling step of forming in said second diameter section an uneven groove section with an irregular cross section having successively alternating high and low portions, through a rolling operation using a roller.

9. A manufacturing method as defined in claim 7, wherein, in said second rolling step, said uneven groove section is formed while both ends of said first diameter section are in a free state so as to not be fixed.

10. A manufacturing method as defined in claim 7, wherein, in said second rolling step, said uneven groove section is formed while at least one end portion of said first diameter section is fixed.

11. A manufacturing method as defined in claim 7, wherein, in said second rolling step, said uneven groove section is formed while a pressing load is applied to said first diameter section from opposing axial directions.

12. A manufacturing method as defined in claim 7, wherein, in said second rolling step, said uneven groove section is formed with wedge-shape uneven configurations successively arranged so as to have inclined faces on one axial side thereof having a first inclination angle, and inclined faces on a second axial side thereof having a second inclination angle larger than said first inclination angle, so as to facilitate attaching a boot to said boot groove from a first axial direction and hinder detachment of said boot from a second axial direction.

13. A manufacturing method as defined in claim 12, wherein, in said second rolling step, a straight portion having substantially no unevenness is formed in a central portion of said uneven groove section.

14. A manufacturing method as defined in claim 7, wherein, in said second rolling step, said uneven groove section is formed to have a helical groove configuration.

15. A manufacturing method as defined in claim 14, wherein, in said second rolling step, a straight portion having substantially no unevenness is formed in a central portion of said uneven groove section.

16. A manufacturing method as defined in claim 7, wherein, in said second rolling step, said uneven groove section is formed to have a corrugated groove configuration.

17. A manufacturing method as defined in claim 16, wherein, in said second rolling step, a straight portion having substantially no unevenness is formed in a central portion of said uneven groove section.

18. A manufacturing method as defined in claim 7, wherein, in said second rolling step, said uneven groove section is formed to have a combination of a helical groove configuration and a corrugated groove configuration.

19. A manufacturing method as defined in claim 18, wherein, in said second rolling step, a straight portion having substantially no unevenness is formed in a central portion of said uneven groove section.

* * * * *